US010686762B2

(12) United States Patent
Frahim et al.

(10) Patent No.: US 10,686,762 B2
(45) Date of Patent: Jun. 16, 2020

(54) SECURE DATA EXCHANGE PLATFORM

(71) Applicant: Cisco Technology, Inc., San Jose, CA (US)

(72) Inventors: Jazib Frahim, Cary, NC (US); Aun Raza, Dubai (AE); Hazim Hashim Dahir, Raleigh, NC (US); Salvatore Tarallo, Dubai (AE); Klaas Wierenga, Utrecht (NL)

(73) Assignee: Cisco Technology, Inc., San Jose, CA (US)

( * ) Notice: Subject to any disclaimer, the term of this patent is extended or adjusted under 35 U.S.C. 154(b) by 575 days.

(21) Appl. No.: 15/375,335

(22) Filed: Dec. 12, 2016

(65) Prior Publication Data

US 2018/0167370 A1 Jun. 14, 2018

(51) Int. Cl.
*H04L 29/06* (2006.01)
*H04L 29/08* (2006.01)
*H04L 9/14* (2006.01)
*H04W 4/70* (2018.01)

(52) U.S. Cl.
CPC ........... *H04L 63/0435* (2013.01); *H04L 9/14* (2013.01); *H04L 63/0442* (2013.01); *H04L 63/102* (2013.01); *H04L 67/12* (2013.01); *H04L 69/14* (2013.01); *H04W 4/70* (2018.02)

(58) Field of Classification Search
CPC ....... H04L 63/0435; H04L 9/14; H04L 67/12; H04W 4/70
See application file for complete search history.

(56) References Cited

U.S. PATENT DOCUMENTS

| | | | |
|---|---|---|---|
| 5,958,009 A | * | 9/1999 | Friedrich ................ H04L 43/00 709/224 |
| 9,361,481 B2 | | 6/2016 | LaFever et al. |
| 9,584,882 B1 | * | 2/2017 | Barrett .................... H04Q 9/00 |
| 2008/0080718 A1 | * | 4/2008 | Meijer ................ G06F 21/6245 380/282 |
| 2011/0021140 A1 | * | 1/2011 | Binier .................. H04B 5/0043 455/41.1 |

(Continued)

FOREIGN PATENT DOCUMENTS

WO WO-2015185893 A1 12/2015

OTHER PUBLICATIONS

Liu et al., "A Method of Query over Encrypted Data in Database", International Conference on Computer Engineering and Technology, 2009. ICCET '09, pp. 23-27, 2009, IEEE.

(Continued)

*Primary Examiner* — Matthew T Henning
(74) *Attorney, Agent, or Firm* — Behmke Innovation Group LLC; James M. Behmke; Jonathon P. Western

(57) ABSTRACT

In one embodiment, a device in a network receives sensor data from one or more nodes in the network. The device selects a processing mode from among a plurality of processing modes based on a plurality of attributes of the sensor data. The plurality of processing modes comprises a fast data path mode and a slow data path mode. The device encrypts the sensor data using a first encryption mechanism that controls access to the plurality of attributes of the sensor data. The device sends the encrypted sensor data to a cloud-based intermediary based on the selected processing mode for sharing with one or more other devices in one or more other networks.

20 Claims, 9 Drawing Sheets

(56) References Cited

U.S. PATENT DOCUMENTS

| | | | | |
|---|---|---|---|---|
| 2012/0221659 A1* | 8/2012 | Brown | ............... | G06Q 50/01 709/206 |
| 2013/0097417 A1* | 4/2013 | Lauter | ............... | H04L 9/008 713/150 |
| 2013/0262385 A1* | 10/2013 | Kumarasamy | .......... | G06F 16/27 707/634 |
| 2013/0275486 A1* | 10/2013 | Dickinson | ............... | H04L 67/10 709/201 |
| 2013/0275546 A1* | 10/2013 | Saib | ............... | G06F 3/0605 709/217 |
| 2014/0029809 A1* | 1/2014 | Rhoads | ............. | G06K 9/00442 382/112 |
| 2014/0153724 A1* | 6/2014 | Kim | ............... | H04L 63/0428 380/270 |
| 2014/0282786 A1* | 9/2014 | Lajoie | ............... | H04N 21/2743 725/115 |
| 2015/0026343 A1 | 1/2015 | Borges et al. | | |
| 2015/0058629 A1* | 2/2015 | Yarvis | ............... | H04L 63/061 713/171 |
| 2016/0147952 A1* | 5/2016 | Garcia | ............... | G16H 10/60 705/3 |
| 2016/0191474 A1 | 6/2016 | Hinh | | |
| 2017/0041523 A1* | 2/2017 | Rifkin | ............... | G06F 3/00 |
| 2017/0201496 A1* | 7/2017 | Luff | ............... | G06F 16/9566 |
| 2018/0146058 A1* | 5/2018 | Somayazulu | ........... | H04L 43/16 |
| 2018/0167370 A1* | 6/2018 | Frahim | ............... | H04L 63/0435 |

OTHER PUBLICATIONS

Davies, et al., "Privacy Mediators: Helping IoT Cross the Chasm", Proceedings of the 17th International Workshop on Mobile Computing Systems and Applications (HotMobile '16), pp. 39-44, 2016, ACM.

Song, et al., "Practical Techniques for Searches on Encrypted Data", Proceedings of the 2000 IEEE Symposium on Security and Privacy (SP '00), 12 pages, 2000, IEEE Computer Society.

Yang, et al., "Privacy-Preserving Queries on Encrypted Data", ESORICS'06 Proceedings of the 11th European conference on Research in Computer Security, 18 pages, 2006, Springer-Verlag.

* cited by examiner

SECURE DATA EXCHANGE PLATFORM

TECHNICAL FIELD

The present disclosure relates generally to computer networks, and, more particularly, to a secure data exchange platform.

BACKGROUND

Low power and lossy networks (LLNs), e.g., Internet of Things (IoT) networks, have a myriad of applications, such as sensor networks, Smart Grids, and Smart Cities. Various challenges are presented with LLNs, such as lossy links, low bandwidth, low quality transceivers, battery operation, low memory and/or processing capability, etc. Changing environmental conditions may also affect device communications in an LLN. For example, physical obstructions (e.g., changes in the foliage density of nearby trees, the opening and closing of doors, etc.), changes in interference (e.g., from other wireless networks or devices), propagation characteristics of the media (e.g., temperature or humidity changes, etc.), and the like, also present unique challenges to LLNs.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
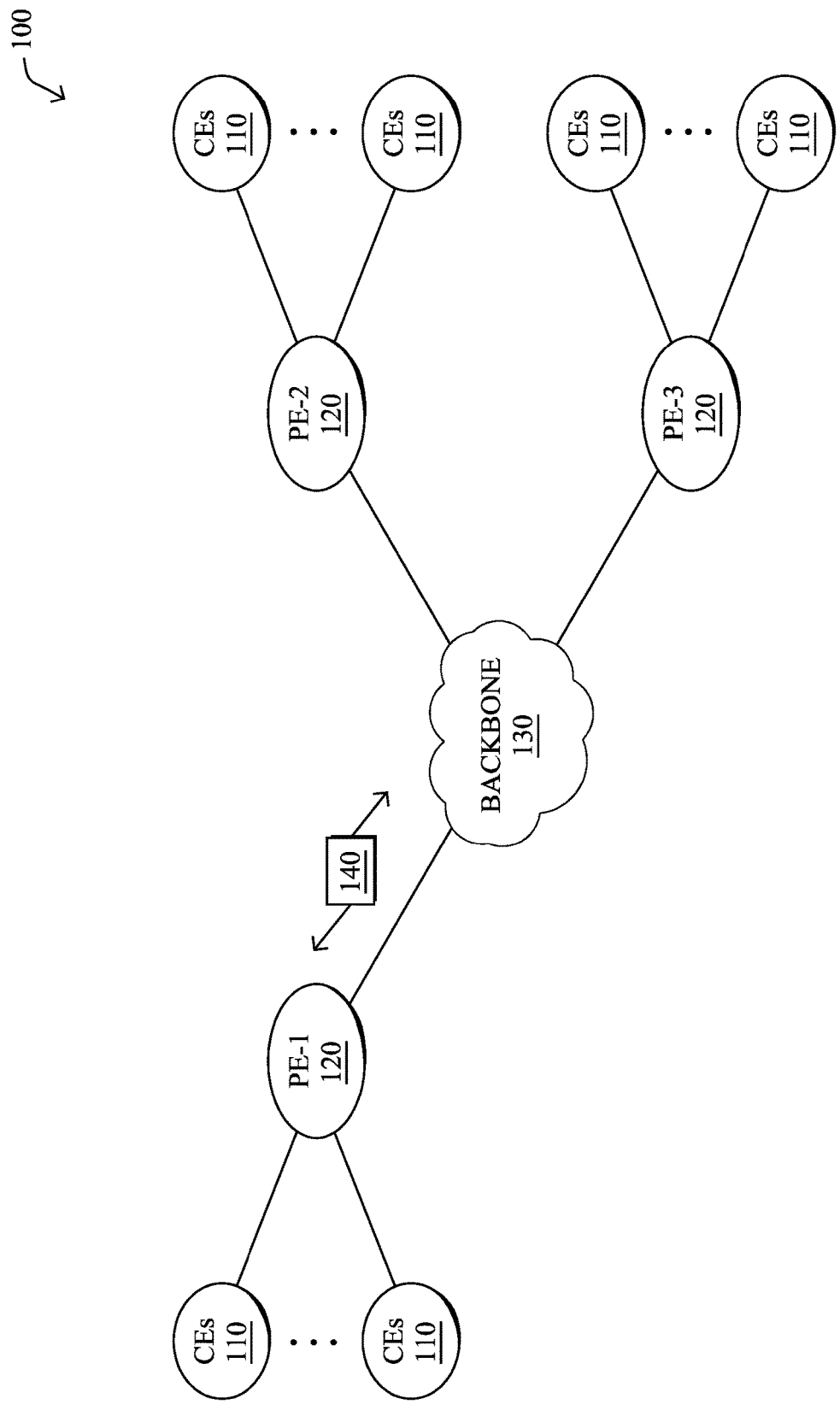
FIGS. 1A-1B illustrate an example communication network.

According to one or more embodiments of the disclosure, a device in a network receives sensor data from one or more nodes in the network. The device selects a processing mode from among a plurality of processing modes based on a plurality of attributes of the sensor data. The plurality of processing modes comprises a fast data path mode and a slow data path mode. The device encrypts the sensor data using a first encryption mechanism that controls access to the plurality of attributes of the sensor data. The device sends the encrypted sensor data to a cloud-based intermediary based on the selected processing mode for sharing with one or more other devices in one or more other networks.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different Service Providers), with potentially a backup link (e.g., a 3G/4G/LTE connection). A site of type B may itself be of different types:

2a.) Site Type B1: a site connected to the network using two MPLS VPN links (e.g., from different Service Providers), with potentially a backup link (e.g., a 3G/4G/LTE connection).

2b.) Site Type B2: a site connected to the network using one MPLS VPN link and one link connected to the public Internet, with potentially a backup link (e.g., a 3G/4G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/LTE backup link). For example, a particular customer site may include a first CE router 110 connected to PE-2 and a second CE router 110 connected to PE-3.

Figure 1B:
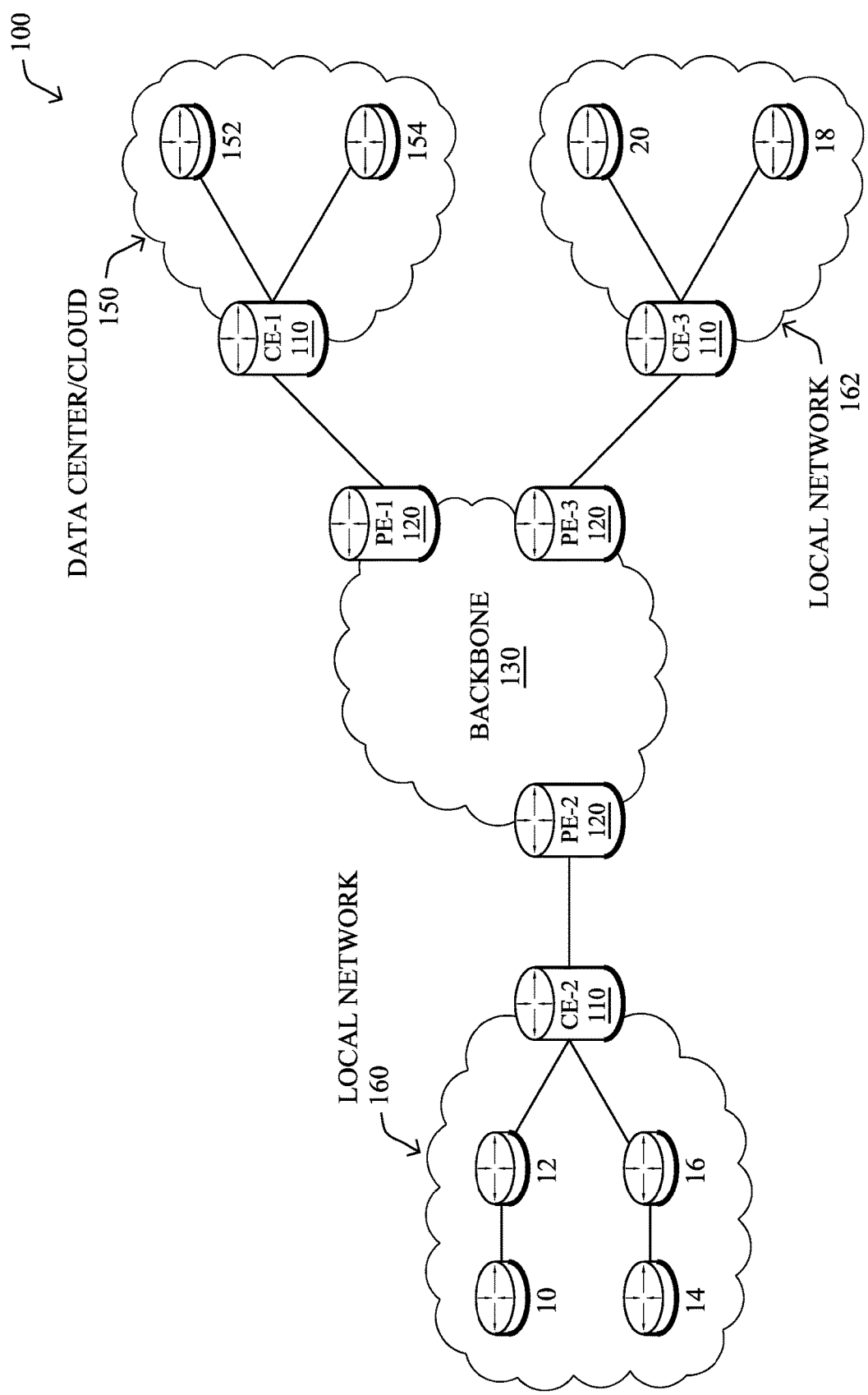

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

In various embodiments, network 100 may include one or more mesh networks, such as an Internet of Things network. Loosely, the term "Internet of Things" or "IoT" refers to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen to thousands or even millions of LLN routers, and support point-to-point traffic (between devices inside the LLN), point-to-multipoint traffic (from a central control point such as the root node to a subset of devices inside the LLN), and multipoint-to-point traffic (from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

In contrast to traditional networks, LLNs face a number of communication challenges. First, LLNs communicate over a physical medium that is strongly affected by environmental conditions that change over time. Some examples include temporal changes in interference (e.g., other wireless networks or electrical appliances), physical obstructions (e.g., doors opening/closing, seasonal changes such as the foliage density of trees, etc.), and propagation characteristics of the physical media (e.g., temperature or humidity changes, etc.). The time scales of such temporal changes can range between milliseconds (e.g., transmissions from other transceivers) to months (e.g., seasonal changes of an outdoor environment). In addition, LLN devices typically use low-cost and low-power designs that limit the capabilities of their transceivers. In particular, LLN transceivers typically provide low throughput. Furthermore, LLN transceivers typically support limited link margin, making the effects of interference and environmental changes visible to link and network protocols. The high number of nodes in LLNs in comparison to traditional networks also makes routing, quality of service (QoS), security, network management, and traffic engineering extremely challenging, to mention a few.

Figure 2:
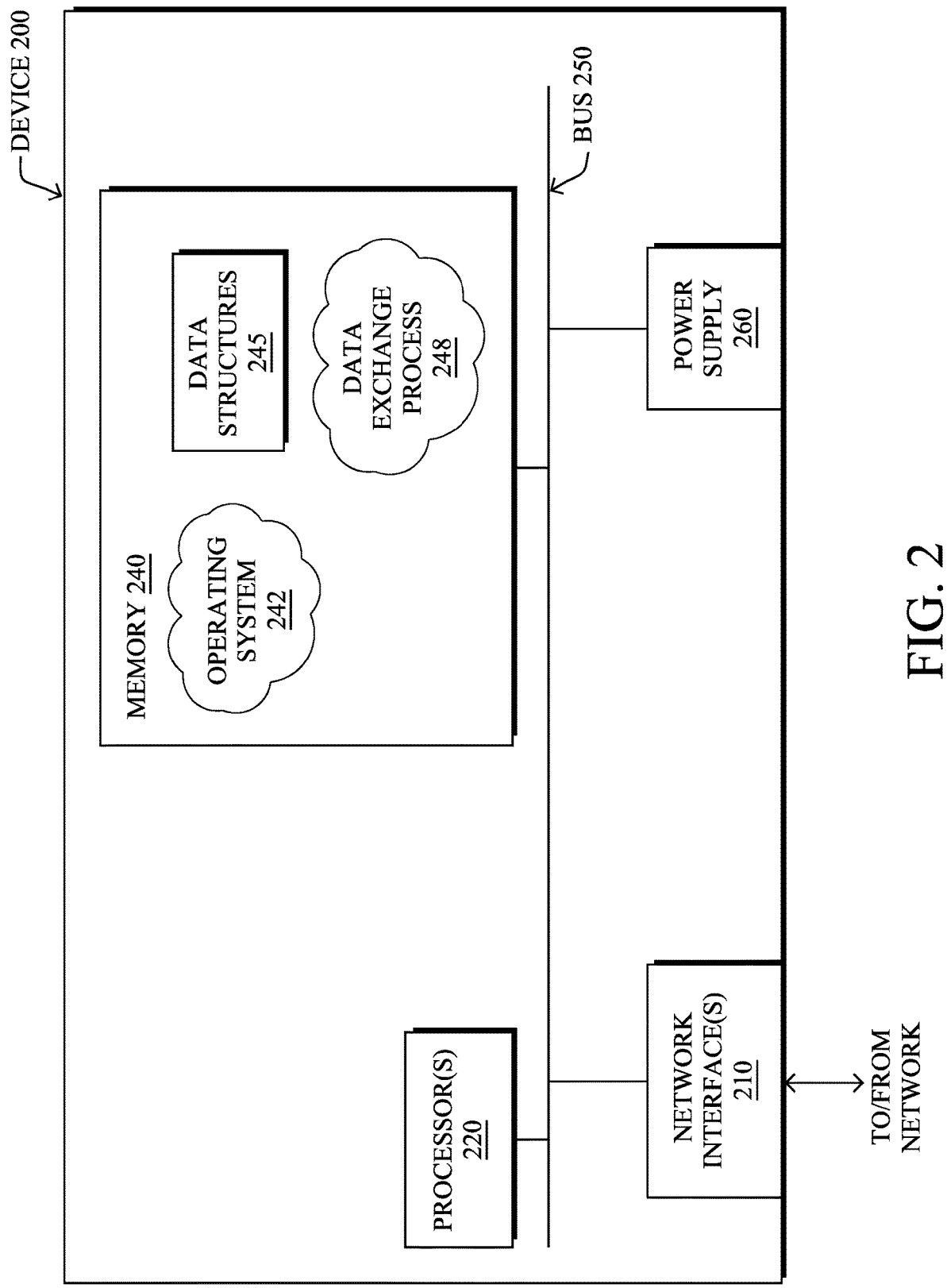
FIG. 2 illustrates an example network device/node.

FIG. 2 is a schematic block diagram of an example node/device 200 that may be used with one or more embodiments described herein, e.g., as any of the computing devices shown in FIGS. 1A-1B, particularly the PE routers 120, CE routers 110, nodes/device 10-20, servers 152-154 (e.g., a network controller located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a data exchange process 248, as described herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

As noted above, many IoT devices have constrained resources in terms of battery power, processing resources, storage resources, etc. In cases in which IoT data is to be shared in a secure manner to multiple parties, this often leads to a tradeoff between the imposed cryptographic overhead and using strong cryptographic mechanisms to distribute sensitive data to the multiple parties. Notably, many IoT deployments involve multiple entities to manage, maintain, collect data, and/or perform device maintenance. For example, one entity may own the actual IoT devices, while another entity may manage and maintain the devices, and a further entity may perform data analysis on the generated sensor data, such as the IoT device manufacturer.

In addition, there are some cases in which the shared IoT data logs require anonymity so that the other parties cannot identify the originator while still being able to analyze the data. For example, if the owner of the devices agrees to share IoT data with a managed service provider, the owner may not want to reveal certain attributes of the data (e.g., source, identity, version, etc.) to the provider.

Secure Data Exchange Platform

The techniques herein introduce a secure data exchange platform for sharing IoT data with multiple entities/data consumers. In some aspects, a cloud-based intermediary may be located between the source of the data and the entities interested in seeing "all" or "partial elements" of the produced data. Further aspects introduce an exchange connector that acts as a middleware layer in communication with the cloud-based intermediary and supports both slow path (e.g., stored) and fast path (e.g., streamed) processing of the data. Such mechanisms allow for the direct data exchange (e.g., bidirectional) between the IoT devices (e.g., sensors, actuators, etc.) beyond the boundaries of the enterprise. Further, the techniques herein allow for the data exchange platform to generate and maintain different encryption keys through a key store whereby access to the store is granted only through a point of presence at the originating network. In other words, the secure data exchange allows the entity in control of the IoT devices to selectively share data from the devices with direct or indirect partners (i.e., partners of partners) and may function as an IoT gateway/aggregator that allows for direct communication between an IoT device and the external entities that are beyond the boundaries of the enterprise.

Specifically, according to one or more embodiments of the disclosure as described in detail below, a device in a network receives sensor data from one or more nodes in the network. The device selects a processing mode from among a plurality of processing modes based on a plurality of attributes of the sensor data. The plurality of processing modes comprises a fast data path mode and a slow data path mode. The device encrypts the sensor data using a first encryption mechanism that controls access to the plurality of attributes of the sensor data. The device sends the encrypted sensor data to a cloud-based intermediary based on the selected processing mode for sharing with one or more other devices in one or more other networks.

Illustratively, the techniques described herein may be performed by hardware, software, and/or firmware, such as in accordance with the data exchange process 248, which may include computer executable instructions executed by the processor 220, to perform functions relating to the techniques described herein.

Figure 3:
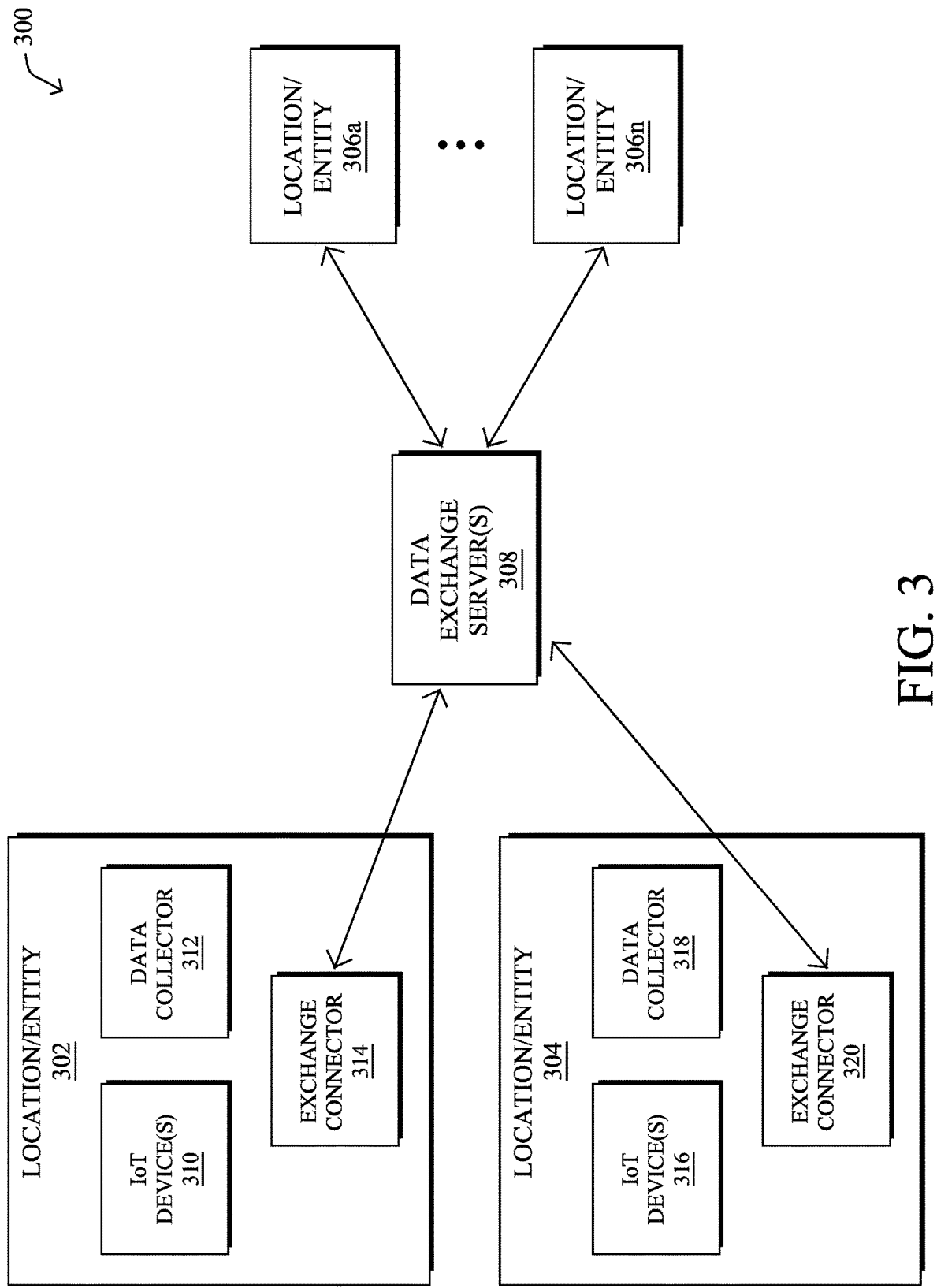
FIG. 3 illustrates an example secure data exchange platform.

Operationally, an example secure data exchange platform 300 is illustrated in FIG. 3, according to various embodiments. In general, secure data exchange platform 300 may be operable to selectively share data with other entities such that:

Reversal of the operations of the devices from shared sensor data is thwarted.

Aggregate data validity is maintained.

The endpoint IoT devices perform as little processing as possible by having expensive cryptographic operations be performed centrally, without sacrificing the security of the system as a whole.

As shown, secure data exchange platform 300 may include a cloud-based intermediary between the source of the IoT data and the recipients. In particular, one or more data exchange server(s) 308 may be in communication with the source network of the IoT data and those of the recipients of the shared data. For example, as shown, assume that a first location/entity network 302 includes any number of IoT devices 310, such as sensors, actuators, and the like, that are to share sensor data with any number of external entities. Similarly, a second location/entity network 304 may also be in communication with data exchange server 308, to share sensor data from its resident IoT devices 316 with authorized recipients. Further location/entity networks 306 (e.g., a first through nth entity network) may also communicate with the cloud-based exchange service and may act as IoT data consumers, IoT data producers, or both.

The architecture shown with respect to data exchange platform 300 allows for the following features to be implemented:
1. Communication between IoT devices (directly or through some sort of local gateway) and the cloud-based intermediary is within the administrative domain of the owner of the IoT data (e.g., as a sub-cloud). This property allows the system to be optimized for inexpensive cryptographic operations between IoT device and the intermediary (e.g., using symmetric encryption or another less computationally-intensive security mechanism), while also allowing for the use of a more computationally-intensive security mechanism (e.g., public key cryptography or the like) for communicating the shared data with the recipients.
2. The intermediary may also act as an aggregator of the IoT data without having any visibility of the content. This means the intermediary can be used to manipulate the data (e.g., pub/sub, etc.), such that the recipients only have selective knowledge about the content (e.g., attributes) of the data.

In various embodiments, secure data exchange platform 300 may also include exchange connectors that act as middleware between the cloud-based exchange service provided by data exchange server(s) 308 and IoT data collectors in the local networks. For example, location/entity network 302 may include a data collector 312 that receives sensor data from the deployed IoT devices 310 and provides the collected data to exchange connector 314. Similarly, location/entity network 304 may include its own data collector 318 that collects data from IoT devices 316 deployed in network 304 and provide the collected data to exchange connector 320. As would be appreciated, any number of data collectors may be deployed in a given network and, in some cases, an exchange connector may be configured to also operate as a data collector.

Generally, an exchange connector may be located at the edge of the network of the location or entity. During operation, the exchange connector may connect the organization to the cloud-based exchange and encrypt the transient IoT data into the respective sub-cloud associated with the sharing entity.

Figure 4:
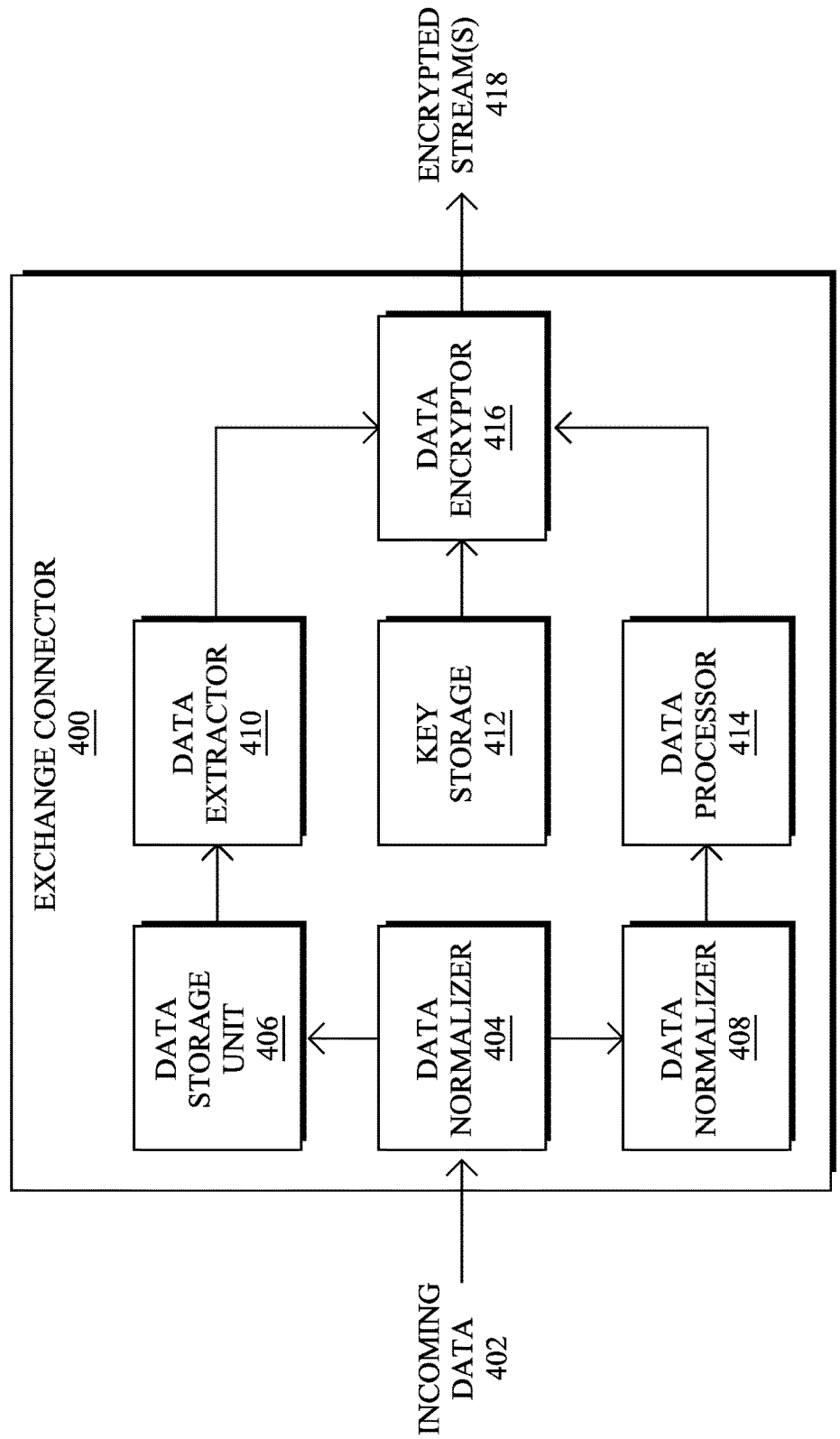
FIG. 4 illustrates an example data exchange connector.

An example data exchange connector 400 is illustrated in FIG. 4, according to various embodiments. As shown, data exchange connector 400 (e.g., a middleware device located at the edge of the local network of an entity) may include any number of storage locations and processes 404-416 to process incoming IoT data 402. For example, exchange connector 400 may receive data 402 (e.g., IoT sensor data) from any number of data collectors in the local network or even from the IoT devices themselves, if exchange connector 400 is configured to act as a data collector. Also, in some embodiments, incoming data 402 may already be encrypted (e.g., by the sending devices), using a less computationally intensive technique, such as symmetric encryption or the like. In turn, data exchange connector 400 may decrypt the incoming data 402 for further, localized processing. As would be appreciated, the processes of exchange connector 400 may be executed by a single device or, alternatively, across multiple devices in a distributed manner.

In some embodiments, exchange connector 400 may include a data normalizer 404 that converts incoming data 402 into a normalized form. For example, data normalizer 404 may tag any incoming data 402 by associating metadata with incoming data 402. Such metadata may conform to a universal data model across the data exchange platform. For example, temperature readings from a thermostat may receive different tags than temperature readings from a piece of industrial equipment. This normalization also allows for some equivalency between sensor measurements from different models or brands of IoT devices.

Exchange connector 400 may select a data processing mode for incoming data 402 from among a plurality of data processing modes. For example, exchange connector 400 may select between a slow data path mode and a fast data path mode for incoming data 402 based on the particular data and its attributes. Such attributes may include, but are not limited to, information indicative of the make model, serial number, configuration (e.g., firmware version, hardware capabilities), etc. of the source IoT device, the type of data itself, or any other information regarding the sensor data. To select the data processing mode for a particular piece of incoming data 402, exchange connector 400 may apply any number of filters (e.g., structured rules, etc.) based on the attributes of the data. For example, exchange connector 400 may be preset to process one type of sensor data using the fast data path mode and another type of sensor data using the slow data path mode.

Under the slow data path mode, exchange connector 400 may locally store the normalized data in a data storage unit (DSU) 406. Extraction of any stored data in DSU 406 can then be performed by a data extractor 410 via a query using a simple query language which may be a preexisting query language or a custom query language for use in the data exchange platform. In some embodiments, exchange connector 400 may store the normalized data in DSU 406 in encrypted form (e.g., encrypted with a key), which can then be used by data extractor 410 to extract out the data when requested via an application program interface (API) or the like based on the configured filters/conditions/rules maintained by exchange connector 400.

Under the fast data path mode, certain incoming data 402 that matches the predefined filters/rules may instead be processed by data processor 414 and used to form any number of data streams that include the matched data. For example, one data stream may include measured temperature readings while another may include measured humidity readings. In turn, data processor 414 may immediately send the data stream(s) to data encryptor 416, to push the data stream to the cloud-based exchange service.

Regardless of whether exchange connector 400 processes a particular set of incoming data 402 using the slow data path mode or the fast data path mode, data encryptor 416 may generate the corresponding encryption keys for the data stream sent to the cloud-based exchange service. Such keys may be stored in a key store 412, either locally on exchange connector 400, or on another device in the same local network that is in communication with exchange connector 400 (e.g., an administrator device, etc.). As data encryptor 416 encrypts the data, it may send the resulting encrypted data stream(s) to a corresponding data store in the sub-cloud for the enterprise of exchange connector 400 for consumption by the authorized subscribers.

To ensure the privacy of the data shared by exchange connector 400, an administration portal may allow a user to manage recipient subscriptions to the data (e.g., for both authentication and authorization), as well as distributing the required encryption key(s) to the recipients. For example, in some embodiments, the sensor data shared with the recipients may be encrypted using keys stored in key store 412 that is only accessible from an authorized station within the network of the sharing entity, e.g., by leveraging a dedicated entity-specific key.

Figure 5A:
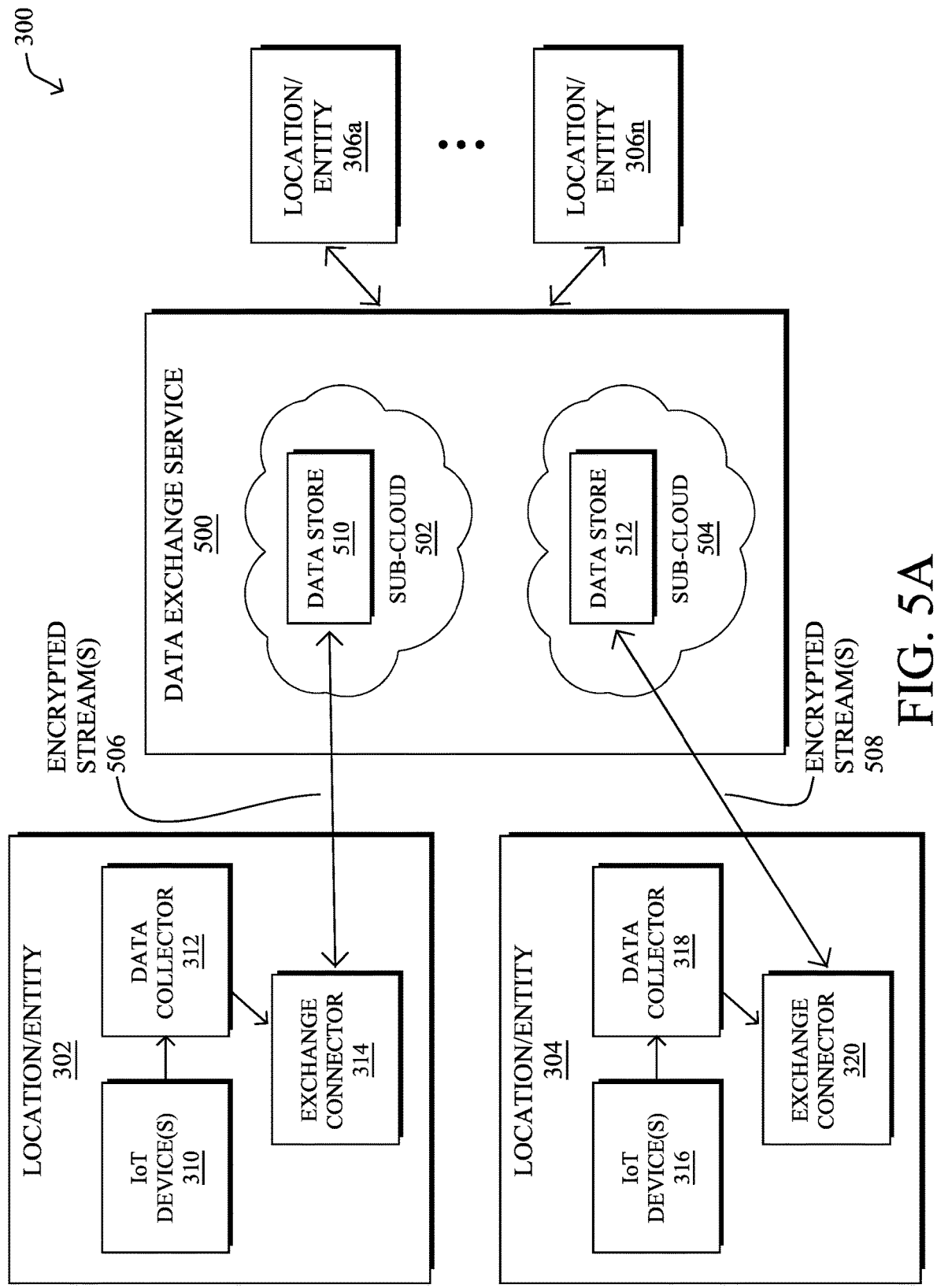
FIGS. 5A-5C illustrate examples of the sharing of sensor data.
Figure 5B:
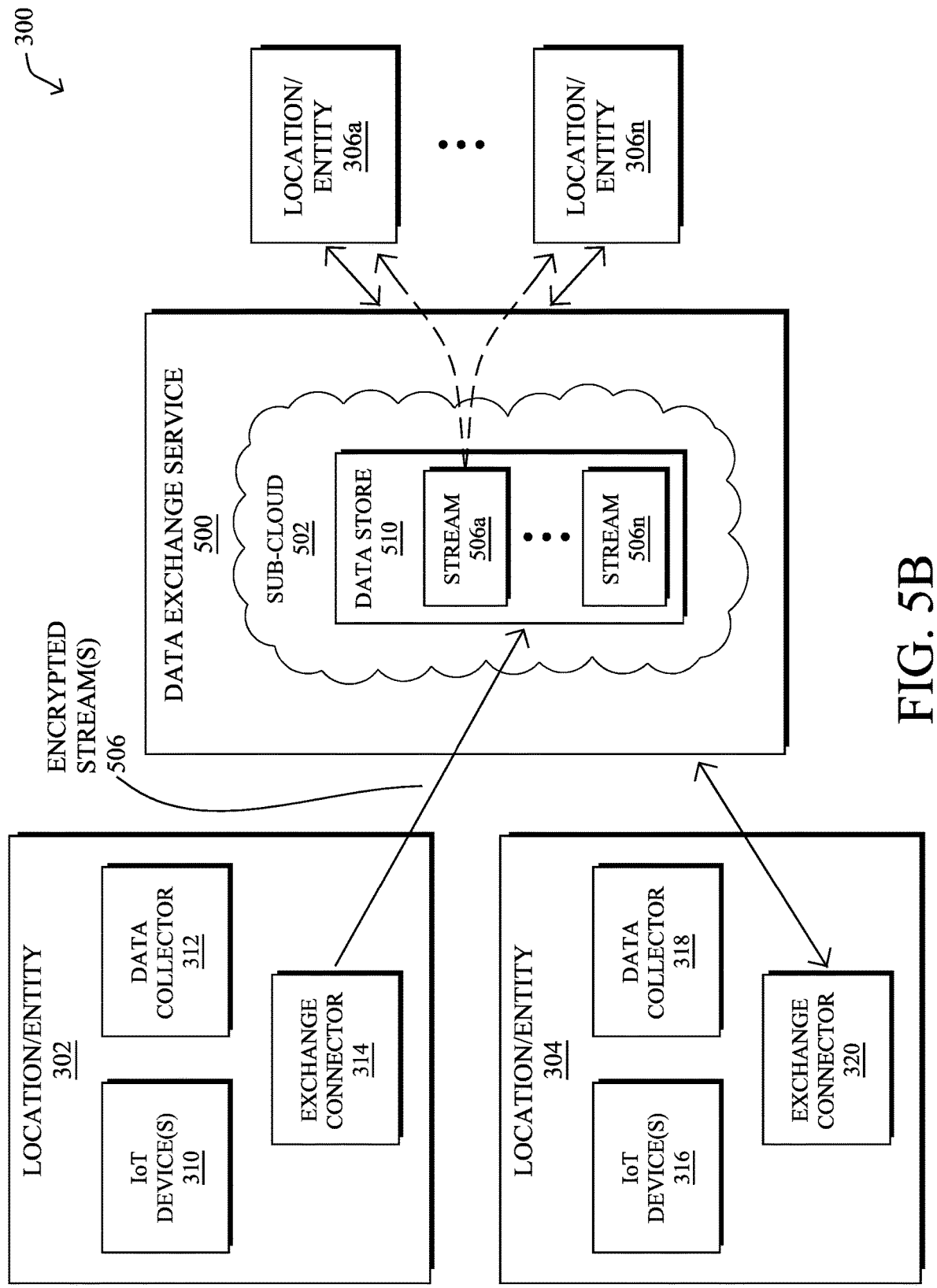
Figure 5C:
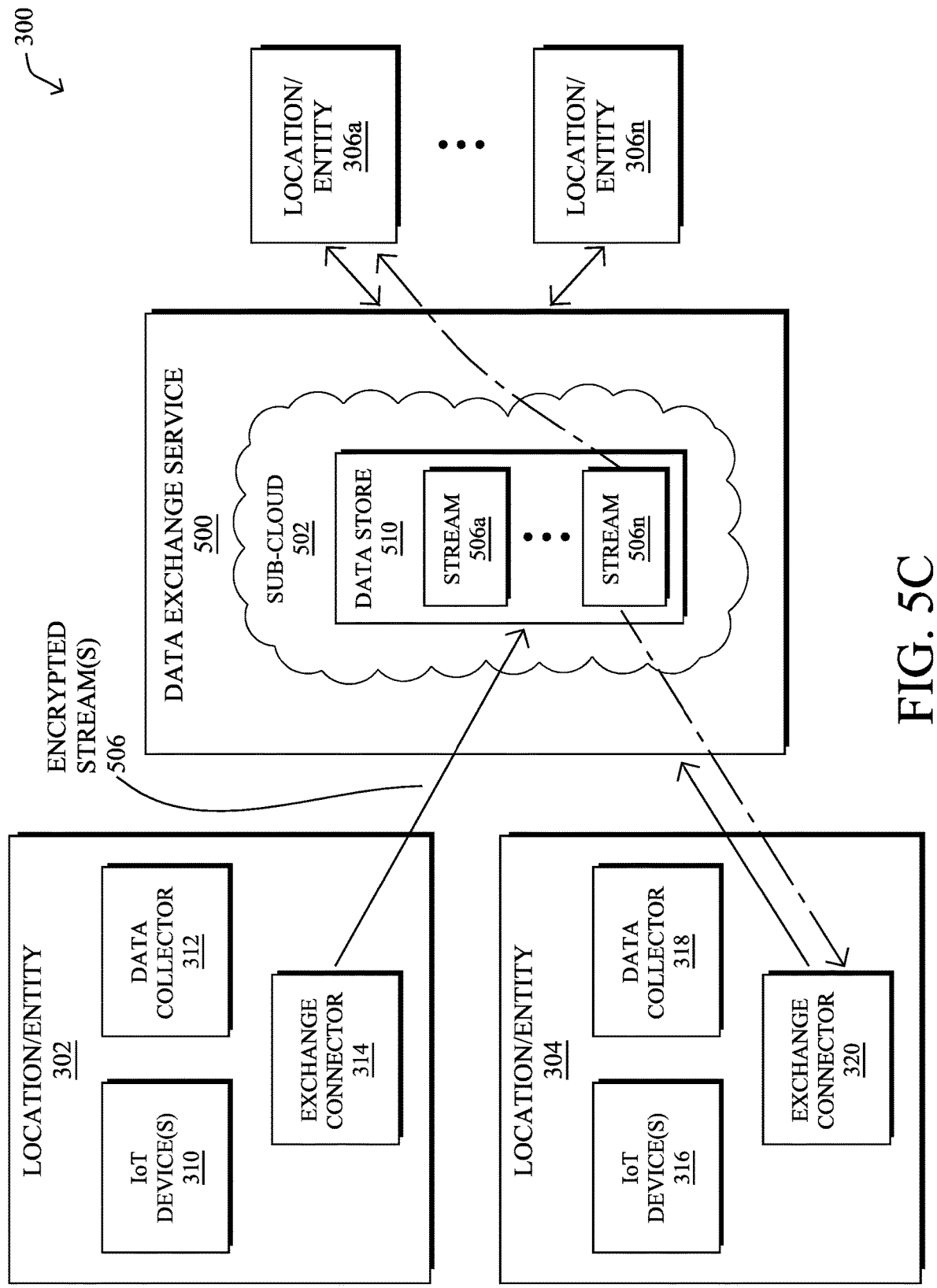

FIGS. 5A-5C illustrate examples of the sharing of sensor data using a secure data exchange platform, according to various embodiments. As shown in FIG. 5A, data exchange service 500 may be a cloud-based data exchange service offered by any number of intermediaries (e.g., servers 308) that are part of a cloud-based system. Within the cloud-based system may be any number of sub-clouds associated with each of the different sharing entities. For example, location/entity network 302 may be associated with a sub-cloud 502, location/entity network 304 may be associated with sub-cloud 504, etc.

The data flows from the IoT devices into their respective sub-clouds and on to their recipients may proceed as follows:

1.) The IoT sensors and/or data collectors in the network of the entity send either raw data or tagged (normalized) data to the DSU of the local exchange connector. For example, IoT devices 310 in the location/entity network 302 may send sensor data to data collector 312, which then sends the collected data on to exchange connector 314 at the edge of network 302. Similarly, IoT devices 316 in location/entity network 304 may send sensor data to data collector 318, which then sends the collected data on to exchange connector 320 at the edge of network 304.

2.) If the data received by an exchange connector is raw, the exchange connector may use its data normalizer to parse, normalize, and tag the data with appropriate metadata. This allows for simplified filtering/querying, after which it takes the slow or fast data path, as detailed above. In some cases, if the data received by the exchange connector is already normalized and tagged, it may simply proceed on to processing either using the slow data path or the fast data path.

3.) Once the incoming data is normalized, the exchange connector may select a processing mode for the data by assessing the attributes of the data using one or more predefined filters/rules. Such rules may be defined via the administration portal, to determine whether the normalized sensor data should be stored for later querying (e.g., using the slow data path) or included in a data stream immediately under the fast data path.

4.) After encryption, the exchange connector may upload the encrypted data stream from either the slow or fast data path to the sub-cloud associated with the sending entity network. Notably, the exchange connector may send the encrypted data to a corresponding data store in the sub-cloud associated with the entity. For example, exchange connector 314 may send encrypted data stream(s) 506 to data store 510 in sub-cloud 502 and exchange connector 320 may send encrypted data stream(s) 508 to data store 512 in sub-cloud 504. If the data is sent via the slow data path, the exchange connector may send the data in response to first receiving a query/request for the data from an authorized recipient.

As shown in FIG. 5B, the filters used by the exchange connectors may control which attributes of the sensor data can be shared with a given recipient entity. To remove duplication of data when it is shared, multiple data streams may be created and encrypted with their unique keys. For example, consider the following access control model configured for an exchange connector:

In other words, the sharing entity (e.g., the entity of network 302) may selectively enable which data attributes are shared with which entity (e.g., the entities associated with networks 306). For example, the first attribute may be model of the sensor whereas the seventh attribute may be the firmware version of the sensor with more restricted access.

Based on the access control model shown in Table 1, encrypted data streams 506 may be formed based on their common sets of permissions (e.g., as groups of n-number of data streams 506a-506n). For example, the first and fifth attributes could be encrypted over stream 1, the third and fourth attributes could be encrypted over stream 2, the second and sixth attributes could be encrypted over stream 3, and the seventh attribute encrypted over stream 4. Thus, if entity C needs to access the data from the sharing entity, it may subscribe to streams 1, 3, and 4. Similarly, entity B may subscribe to streams 1 and 2, while entity A may subscribe to streams 1-3.

Each entity authorized to receive the shared data may be connected to data exchange service 500 via its own exchange connector at the edge of its local network, either as a stand-alone device or as a virtual device. For example, as shown in FIG. 5B, an exchange connector that is part of location/entity 306a may contact data exchange service using a secure protocol such as the Secure Socket Layer (SSL), Transport Layer Security (TLS), or the like, to identify itself using a unique identifier. Such an identifier may be provided offline or through another secure mechanism (e.g., to exchange connector 314 or another device associated with the entity of network 302). During use, the identifier may impose the access rules that control which of data streams 506a-506n the exchange connector of location/entity network 306a is authorized to access.

Once authorization is complete, a secure protocol may be used to push the corresponding encryption keys to the authorized exchange connector, thereby completing the subscription process. At this point, the exchange connector may initiate requests for the IoT data (e.g., via a query language) and/or may receive the data on a push basis. In turn, the exchange connector may decrypt the data using the shared keys for consumption by the authorized location/entity.

By way of example, assume that the exchange connectors of both location/entity 306a and location/entity 306n are authorized to access the information in data stream 506a. However, other locations/entities may be prevented from accessing this information. Similarly, as shown in FIG. 5C, exchange connector 320 of location/entity network 304 and the exchange connector of location/entity network 306n may be authorized to access and decrypt the information in stream 506n, while the exchange connector of location/entity network 306a cannot. In other words, data exchange service 500 may work in conjunction with the exchange connector middleware to control which IoT information is shared, how the information is shared, and with whom the information is shared.

TABLE 1

| Entity | Attribute 1 | Attribute 2 | Attribute 3 | Attribute 4 | Attribute 5 | Attribute 6 | Attribute 7 |
|---|---|---|---|---|---|---|---|
| A | Yes | Yes | Yes | Yes | Yes | Yes | No |
| B | Yes | No | No | No | Yes | Yes | No |
| C | Yes | Yes | No | No | Yes | No | Yes |

In various embodiments, any number of encryption keys may be used to encrypt streams 506a-506n in data store 510 of sub-cloud 502. For example, in a simple case, a single encryption key may be used. Alternatively, each of streams 506a-506n (e.g., the first through nth data stream) may be encrypted using separate keys that are pushed to the authorized devices, entities, etc. In either case, the authorization model described above may be used, to ensure that the receiving device and entity are authorized to do so. Note that while multiple keys may provide more security across all of the data, it may require greater overhead, as a new key would be needed for each stream.

Figure 6:
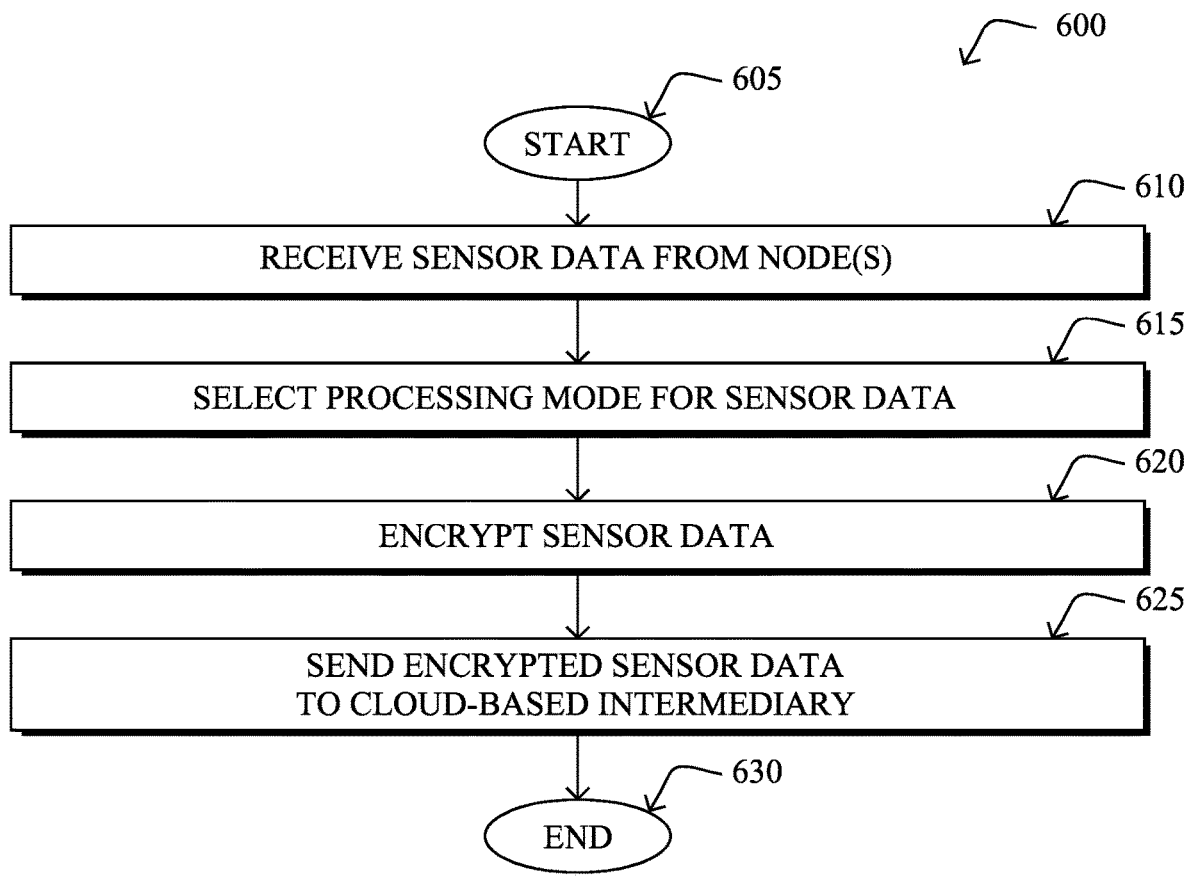
FIG. 6 illustrates an example simplified procedure for making sensor data available in a secure data exchange platform.

FIG. 6 illustrates an example simplified procedure for making sensor data available in a secure data exchange platform, in accordance with one or more embodiments described herein. For example, a non-generic, specifically configured device (e.g., device 200) in a network may perform procedure 600 by executing stored instructions (e.g., process 248). The procedure 600 may start at step 605, and continues to step 610, where, as described in greater detail above, the device may receive sensor data from one or more nodes in the network. For example, the device may receive sensor data from one or more IoT nodes either directly or indirectly, such as from one or more data collectors in the network.

At step 615, as detailed above, the device may select a processing mode for the received sensor data from among a plurality of processing modes. In various embodiments, the plurality of processing modes may include a slow data path mode and a fast data path mode. In the slow data path mode, the device may first store the sensor data locally. In the fast data path mode, however, the device may simply process the sensor data for sharing via a cloud-based data exchange service. The device may also select the data processing mode based on one or more attributes of the received data. For example, the device may compare the attributes of the data to one or more filters, to determine whether to process the data using the fast or slow data path mode.

At step 620, the device may encrypt the sensor data using a first encryption mechanism that controls access to the attributes of the sensor data, as described in greater detail above. For example, only certain entities may be authorized to access regarding the firmware version of the particular IoT node that generated the sensor data. Such an encryption mechanism may, for example, be a more computationally intensive form of encryption that that used to convey the data to the device. Notably, the IoT nodes themselves may use symmetric encryption or a similar mechanism to secure the data sent to the device, whereas the device itself may use public key encryption or the like to share the data with the remote networks/entities.

At step 625, as detailed above, the device may send the encrypted sensor data to a cloud-based intermediary for sharing with one or more other devices in one or more other networks. For example, the other devices may be associated with the manufacturer(s) of the IoT nodes, partners of the entity sharing the data, etc. Such a cloud-based intermediary may act as a data store within a sub-cloud associated with the sharing entity, to allow the other authorized entities to receive the shared data. Procedure 600 then ends at step 630.

It should be noted that while certain steps within procedure 600 may be optional as described above, the steps shown in FIG. 6 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, allow an owner of IoT nodes to share data from the nodes without having to maintain multiple connections with the entities authorized to receive the shared data. Instead, the sharing and receiving entities may connect to a data exchange service that allows the sharing entity to control which information is shared and to whom. In further aspects, the techniques herein allow for the use of computationally cheap techniques to secure the transport, yet still leverage strong cryptographic techniques to share the data with third parties. Further, the techniques herein reduce the overall policy definitions required, in comparison to using separate connections for each receiving entity.

While there have been shown and described illustrative embodiments that provide for a secure data exchange platform, it is to be understood that various other adaptations and modifications may be made within the spirit and scope of the embodiments herein. For example, while certain embodiments are described herein with respect to using certain encryption techniques, other encryption techniques may also be used as desired. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
   receiving, at a device in a network, sensor data from one or more nodes in the network;
   selecting, by the device, a processing mode from among a plurality of processing modes based on a plurality of attributes of the sensor data, wherein the plurality of attributes of the sensor data include at least one of a model of a source of the sensor data, a serial number of the source of the sensor data, and a configuration of the source of the sensor data, and wherein the plurality of processing modes comprises a fast data path mode in which the device sends the sensor data to one cloud-based intermediary without receiving a request for the sensor data and a slow data path mode in which the device sends the sensor data to the one cloud-based intermediary after receiving a request for the sensor data from one or more other devices in one or more other networks;
   encrypting, by the device, a plurality of streams of the sensor data using a first encryption mechanism that controls access to the plurality of attributes of the sensor data, wherein each of the encrypted plurality of streams of the sensor data includes a particular subset of the plurality of attributes of the sensor data; and sending, by the device, the encrypted plurality of streams of the sensor data to the one cloud-based intermediary based on the selected processing mode for sharing with the one or more other devices in the one or more other networks, wherein each of the one or more devices in the one or more other networks receives a particular subset of the encrypted plurality of streams of the sensor data from the one cloud-based intermediary.

2. The method as in claim 1, further comprising:
receiving, at the device, the sensor data from the one or more nodes in an encrypted form that uses a second encryption mechanism that differs from the first encryption mechanism.

3. The method as in claim 2, wherein the first encryption mechanism comprises public key encryption and the second encryption mechanism comprises symmetric encryption.

4. The method as in claim 1, wherein selecting the processing mode comprises:
selecting, by the device, the fast data path mode as the processing mode by comparing the attributes of the sensor data to one or more filters, wherein the device publishes the encrypted sensor data to the one cloud-based intermediary via one or more data feeds.

5. The method as in claim 4, wherein the one or more other devices are authorized to subscribe to the one or more data feeds based on the attributes of the sensor data and via one or more encryption keys associated with the one or more other devices.

6. The method as in claim 4, wherein the one or more other devices are authorized to subscribe to the one or more data feeds based on the attributes of the sensor data and via one or more encryption keys associated with the data feeds.

7. The method as in claim 1, further comprising:
storing, by the device, the sensor data locally, in response to selecting the slow data path mode.

8. The method as in claim 1, further comprising:
normalizing, by the device, the sensor data by associating metadata with the sensor data, prior to encrypting the sensor data.

9. The method as in claim 1, further comprising:
generating, by the device, a key for the first encryption mechanism; and
storing, by the device, the generated key.

10. An apparatus, comprising:
one or more network interfaces to communicate with a network;
a processor coupled to the network interfaces and configured to execute one or more processes; and
a memory configured to store a process executable by the processor, the process when executed operable to:
receive sensor data from one or more nodes in the network;
select a processing mode from among a plurality of processing modes based on a plurality of attributes of the sensor data, wherein the plurality of attributes of the sensor data include at least one of a model of a source of the sensor data, a serial number of the source of the sensor data, and a configuration of the source of the sensor data, and wherein the plurality of processing modes comprises a fast data path mode in which the device sends the sensor data to one cloud-based intermediary without receiving a request for the sensor data and a slow data path mode in which the device sends the sensor data to the one cloud-based intermediary after receiving a request for the sensor data from one or more other devices in one or more other networks;
encrypt a plurality of streams of the sensor data using a first encryption mechanism that controls access to the plurality of attributes of the sensor data, wherein each of the encrypted plurality of streams of the sensor data includes a particular subset of the plurality of attributes of the sensor data; and
send the encrypted plurality of streams of the sensor data to the one cloud-based intermediary based on the selected processing mode for sharing with the one or more other devices in the one or more other networks, wherein each of the one or more devices in the one or more other networks receives a particular subset of the encrypted plurality of streams of the sensor data from the one cloud-based intermediary.

11. The apparatus as in claim 10, wherein the apparatus receives the sensor data from the one or more nodes in an encrypted form that uses a second encryption mechanism that differs from the first encryption mechanism.

12. The apparatus as in claim 11, wherein the first encryption mechanism comprises public key encryption and the second encryption mechanism comprises symmetric encryption.

13. The apparatus as in claim 10, wherein the apparatus selects the processing mode by:
selecting the fast data path mode as the processing mode by comparing the attributes of the sensor data to one or more filters, wherein the apparatus publishes the encrypted sensor data to the one cloud-based intermediary via one or more data feeds.

14. The apparatus as in claim 13, wherein the one or more other devices are authorized to subscribe to the one or more data feeds based on the attributes of the sensor data and via one or more encryption keys associated with the one or more other devices.

15. The apparatus as in claim 13, wherein the one or more other devices are authorized to subscribe to the one or more data feeds based on the attributes of the sensor data and via one or more encryption keys associated with the data feeds.

16. The apparatus as in claim 10, wherein the process when executed is further operable to:
store the sensor data locally, in response to selecting the slow data path mode.

17. The apparatus as in claim 10, wherein the process when executed is further operable to:
normalize the sensor data by associating metadata with the sensor data, prior to encrypting the sensor data.

18. The apparatus as in claim 10, wherein the process when executed is further operable to:
generate a key for the first encryption mechanism; and
store the generated key.

19. A tangible, non-transitory, computer-readable medium storing program instructions that cause a device in a network to perform a process comprising:
receiving, at the device, sensor data from one or more nodes in the network;
selecting, by the device, a processing mode from among a plurality of processing modes based on a plurality of attributes of the sensor data, wherein the plurality of attributes of the sensor data include at least one of a model of a source of the sensor data, a serial number of the source of the sensor data, and a configuration of the source of the sensor data, and wherein the plurality of processing modes comprises a fast data path mode in which the device sends the sensor data to one cloud-based intermediary without receiving a request for the sensor data and a slow data path mode in which the device sends the sensor data to the one cloud-based intermediary after receiving a request for the sensor data from one or more other devices in one or more other networks;

encrypting, by the device, a plurality of streams of the sensor data using a first encryption mechanism that controls access to the plurality of attributes of the sensor data, wherein each of the encrypted plurality of streams of the sensor data includes a particular subset of the plurality of attributes of the sensor data; and sending, by the device, the encrypted plurality of streams of the sensor data to the one cloud-based intermediary based on the selected processing mode for sharing with the one or more other devices in the one or more other networks, wherein each of the one or more devices in the one or more other networks receives a particular subset of the encrypted plurality of streams of the sensor data from the one cloud-based intermediary.

20. The computer-readable medium as in claim 19, wherein selecting the processing mode comprises:

selecting, by the device, the fast data path mode as the processing mode by comparing the attributes of the sensor data to one or more filters, wherein the device publishes the encrypted sensor data to the one cloud-based intermediary via one or more data feeds.

* * * * *